Jan. 2, 1962 G. E. PIHL 3,015,782

COMPRESSOR AMPLIFIER

Filed June 10, 1959 2 Sheets-Sheet 1

INVENTOR.
GEORGE E. PIHL

BY Porter, Chittick & Russell

ATTORNEYS

INVENTOR.
GEORGE E. PIHL
BY
Porter, Chittick & Russell
ATTORNEYS 3,015,782
Patented Jan. 2, 1962

1

3,015,782

COMPRESSOR AMPLIFIER

George E. Pihl, Abington, Mass., assignor to Technology Instrument Corporation of Acton, a corporation of Massachusetts Filed June 10, 1959, Ser. No. 819,345
9 Claims. (Cl. 330—145)

This invention relates to compressor amplifiers and more particularly to compressor amplifiers of the backward acting type.

The principal object of the present invention is to provide a compressor amplifier capable of producing a constant amplitude harmonic distortion-free output in response to a signal varying in frequency and amplitude.

A more specific object of the present invention is to provide a compressor amplifier for signals in the frequency range of 200 cycles to 12 kilocycles, comprising the series combination of a fixed resistor and a variable resistor connected to ground, means for applying an input signal varying in frequency and amplitude to said series combination, means for amplifying the signal appearing at the junction of said resistors, an error sensing circuit for comparing the peak positive and negative values of the output of said amplifier to positive and negative D.C. reference voltages, means for producing an error signal corresponding to the difference between said peak values and said reference voltages, means for amplifying said error signal, means for rectifying said error signal, and means responsive to said rectified error signal for varying the value of said variable resistor in a direction to correct the error represented by said error signal.

Figure 1:
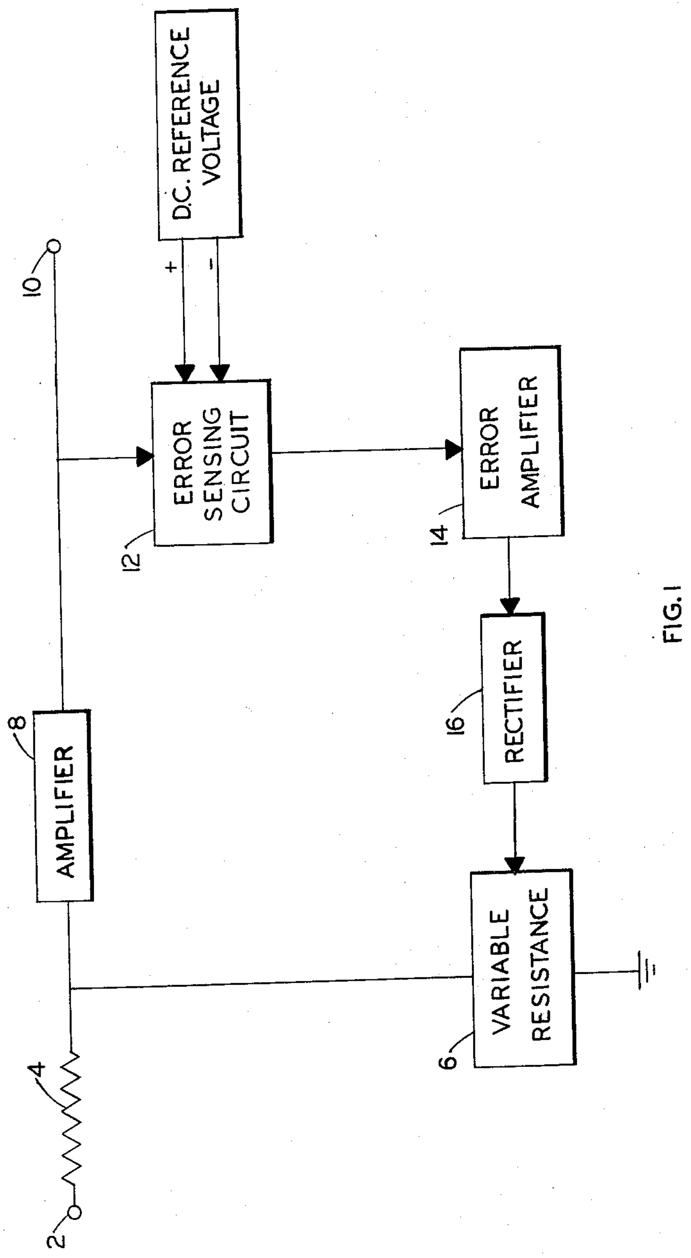
Figure 2:
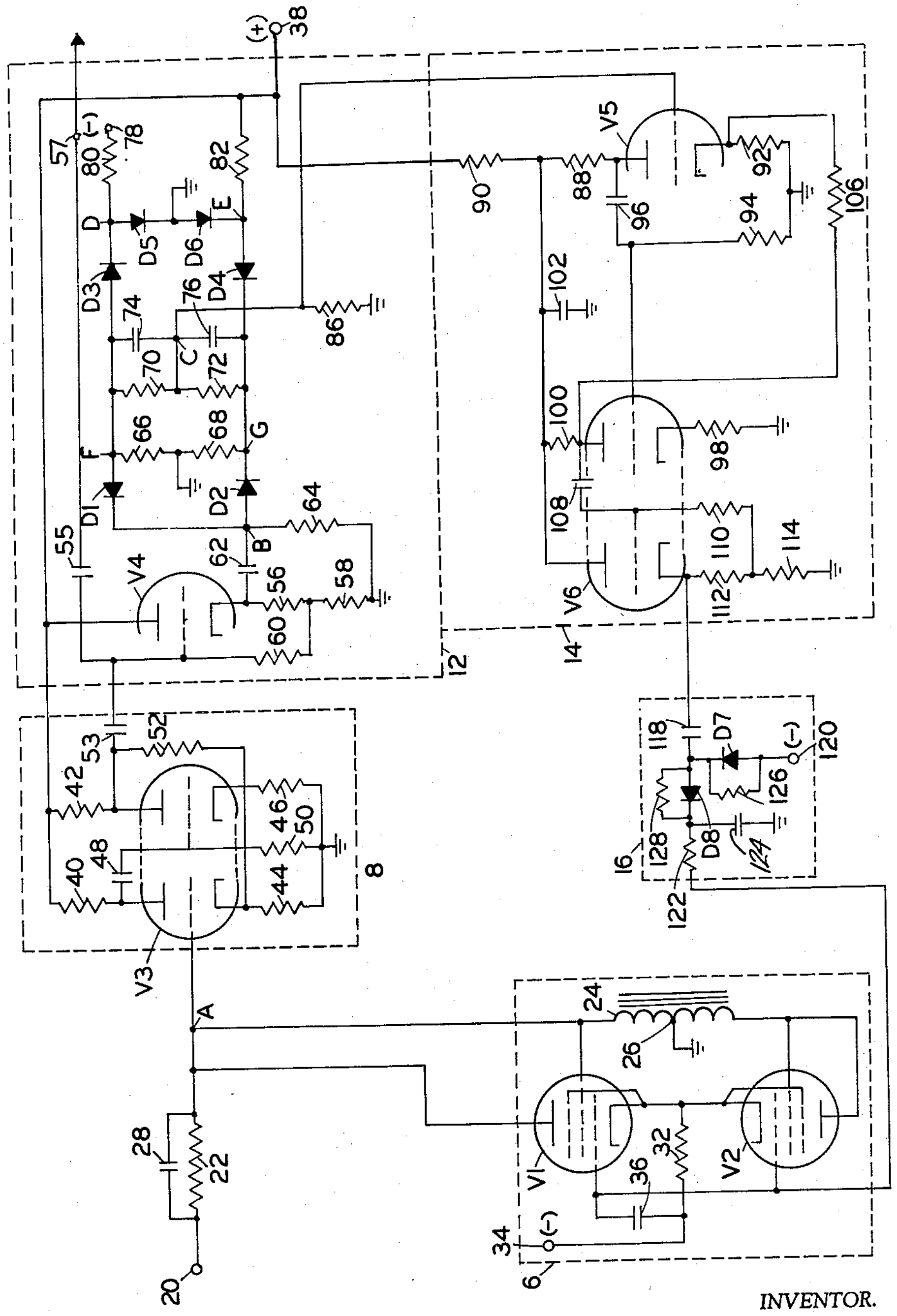

Other objects and many of the attendant advantages of the present invention will become more readily apparent as reference is had to the following detailed description when considered together with the accompanying drawings, wherein:

FIG. 1 is a block diagram of a compressor amplifier constructed according to the present invention; and FIG. 2 is a circuit diagram of a preferred embodiment of the present invention.

Referring now to FIG. 1, the input signal is applied by way of a terminal 2 to the series combination of a fixed resistance 4 and a variable resistance 6 to ground. The signal appearing at the junction of resistances 4 and 6 is amplified by an amplifier 8 and passed on to an output terminal 10. The output of amplifier 8 also goes to an error sensing circuit 12. In this circuit, the peak positive and negative values of the output of amplifier 8 are compared with positive and negative D.C. reference voltages. Any error signal (the voltages in excess of the reference) developed in error sensing circuit 12 is amplified by an error amplifier 14 and passed on to a rectifier circuit 16 which produces a D.C. output voltage. The D.C. output voltage of rectifier 16 is then utilized to vary the value of variable resistance 6 in a direction to cause the error to be corrected. The variable resistance consists of the plate resistance of two remote cut-off pentodes. These pentodes are operated in push-pull, due to the action of the plate transformer, resulting in a significant reduction in harmonic distortion.

Referring now to FIG. 2, the input signal is applied to a terminal 20 which is connected by a fixed resistor 22 to the plate of a pentode V1 and also by way of an auto transformer coil 24 to the plate of a second pentode V2. Coil 24 has a center tap 26 connected to ground. The screen grids of V1 and V2 are connected to opposite ends of coil 24. A small capacitor 28 is connected across resistor 22. The cathodes and suppressor grids of the

2 two tubes are all connected by a fixed resistor 32 to a negative voltage source 34. Connected between the negative source 34 and the control grids of both tubes is a capacitor 36. The screen grids of V1 and V2 are connected to opposite ends of coil 24.

The signal appearing at A, the junction of coil 24 and resistor 22, is applied to the control grid of the left-hand half of a tube V3. The plates of both halves of tube V3 are connected to a positive voltage source 38 through resistors 40 and 42. The cathodes of the two tube sections are connected by way of resistors 44 and 46 to ground. The plate of the left-hand half of the tube is connected by a capacitor 48, and a resistor 50 is connected to the control grid of the right-hand half of the tube. The plate of the latter half is connected by a resistor 52 to the cathode of the left-hand half of the tube. At the same time, the plate of the right-hand half is connected by a capacitor 53 to (1) the control grid of a cathode follower V4 and (2) a capacitor 55 which is connected to an output terminal 57. The cathode of tube V4 is connected by two resistors 56 and 58 to ground. The control grid is coupled by another resistor 60 to the junction of resistors 56 and 58. The plate of tube V4 is coupled to the positive voltage source 38. The output is taken from the cathode by a capacitor 62 which is connected in series with a resistor 64 connected to ground. The signal appearing at point B, the junction of capacitor 62 and resistor 64, is applied to the error sensing circuit 12.

The error sensing circuit comprises a diode D1 connected on one side to point B and on the other side to ground through a resistor 66. A second diode D2 is connected on one side to point B and on the other side to ground through a second resistor 68 identical in value to resistor 66. The error sensing circuit also comprises two identical resistors 70 and 72 connected in parallel with resistors 66 and 68 and two capacitors 74 and 76 connected in parallel with resistors 70 and 72. The junction of resistors 70 and 72 is coupled to the junction of capacitors 74 and 76. The error sensing circuit also comprises two additional diodes D3 and D4. Diode D3 is connected on one side to the junction of resistor 70 and capacitor 74 and on the other side to a negative voltage source 78 by way of a resistor 80. Diode D4 is connected on one side to the junction of resistor 72 and capacitor 76 and on the other side to the positive voltage source 38 by way of a resistor 82. Two zener diodes D5 and D6 are connected between resistors 80 and 82. The junction of diodes D5 and D6 is connected to ground.

The junction C of capacitors 74 and 76 is connected to ground through a resistor 86. The upper end of resistor 86 is connected to the control grid of a tube V5. The plate of this tube is connected by two resistors 88 and 90 to positive voltage source 38. The cathode of tube V5 is connected to ground by a resistor 92. Connected between ground and the plate of tube V5 is resistor 94 and also a capacitor 96. Connected between capacitor 96 and resistor 94 is the control grid of the right half of a dual triode V6. The cathode of the right-hand section of tube V6 is connected to ground by a resistor 98, and the corresponding plate of tube V6 is connected by a resistor 100 to the junction of resistors 88 and 90. A capacitor 102 is connected between ground and the junction of resistors 90 and 88. The cathode of tube V5 is connected to the right-hand plate of tube V6 by a resistance 106. The right-hand plate of tube V6 is connected by a capacitor 108 to the control grid of the left-hand section. Capacitor 108 is also connected to a resistance 110 which is connected to the junction of two resistances 112 and 114 which are connected between the left-hand cathode of tube V6 and ground. The left-hand plate of tube V6 is connected directly to the junction of resistors 88 and 90.

The cathode of the left-hand section of tube V6 is connected to a rectifying circuit 16. It is connected by a capacitor 118 to the junction of two diodes D7 and D8. The other side of diode D7 is connected to a negative voltage source 120. The other side of diode D8 is connected by a resistance 122 to the control grids of tubes V1 and V2. A capacitor 124 is connected between ground and the junction of diode D8 and resistance 122. Additional resistances 126 and 128 are connected across diodes D7 and D8.

Operation of the circuit of FIG. 2 is as follows:

The input signal, which may have a frequency as low as approximately 200 cycles and as high as approximately 12 kilocycles or higher, is applied at terminal 20. The resulting voltage appearing at point A is amplified by the two stages of tube V3 and the output taken at terminal 57. The output appearing at the plate of the right-hand half of tube V3 is also applied to tube V4. The latter may be considered part of the error sensing circuit 12, and its chief function is to provide a low impedance input to the sensing circuit. This input is applied to the sensing circuit at point B.

Under normal conditions, diodes D1 and D2 are biased off and diodes D3 and D4 are biased on. D1 will conduct on a negative swing of the voltage at point B, and D2 will conduct on a positive swing of the voltage at the same point. When D1 conducts, the voltage at F becomes more negative than the voltage at point D, causing D3 to shut off and a negative pulse to pass through capacitor 74 and resistor 86. When D2 conducts, the voltage at G becomes more positive than the voltage at point E, causing D4 to shut off and a positive pulse to pass through capacitor 76 and resistor 86. The amplitude of the pulses passed by capacitors 74 and 76 is proportional to the difference between voltages at D and F and E and G respectively.

The positive and negative error signals developed across resistor 86 are amplified in turn by tubes V5 and V6. The output pulses appearing across resistors 112 and 114 are applied to the rectifier circuit 16. Negative pulses are passed by diode D7, charging capacitor 118. On positive swings, diode D8 conducts and capacitor 124 charges up to twice the value of the voltage on capacitor 118. The normal grid voltages produced by the rectifier circuit 16 are slightly more negative than the plate supply voltages on tubes V1 and V2, but when an error pulse is passed by the rectifier, the grid voltages become less negative and thereby reduce the resistance offered by tubes V1 and V2. This in turn reduces the amplitude of the signal at point A and thereby diminishes the size of the error pulses. The error pulses decrease in amplitude and reach zero when the amplitude of the signal at point A is constant at the level determined by the values of the direct current reference voltages at points D and E.

It is to be noted that V1 and V2 are class A amplifiers connected in push-pull relation. This push-pull relation is important since it eliminates harmonic distortion. It is to be noted also that the system of FIG. 2 has been found to produce a constant-amplitude output free of the harmonic distortion in response to an input signal whose frequency was swept through a frequency band of approximately 200 cycles to 12 kilocycles.

Obviously, many modifications and variations of the present invention are possible in the light of the above teachings. Therefore, it is to be understood that the invention is not limited in its application to the details of construction and arrangement of parts specifically described or illustrated, and that within the scope of the appended claims, it may be practiced otherwise than as specifically described or illustrated.

I claim:

1. A compressor amplifier comprising a first input terminal to which an alternating current input signal is to be applied, an alternating current amplifier for amplifying said alternating current input signal, said amplifier having a second input terminal, a fixed resistance connecting said first and second input terminals, a variable resistance connected between ground and the junction of said fixed resistance and said second terminal, an output terminal, means for applying the alternating current signal output of said amp ifier to said output terminal, means for establishing positive and negative direct current reference voltages, means for directly comparing said alternating current signal output with said positive and negative reference voltages and for producing an alternating current error signal having positive and negative components proportional in value to the differences in amplitude between said positive and negative reference voltages and the positive and negative excursions respectively of said alternating current signal output, and means responsive to the positive and negative components of said error signal for varying said variable resistance in the direction and by the amount required to minimize said error signal.

2. A compressor amplifier capable of producing a constant amplitude harmonic distortion-free output in response to a signal varying in frequency and amplitude, comprising an input terminal, a fixed resistance, and a variable resistance connected in series between said input terminal and ground, alternating current amplifier means for amplifying the varying signal appearing at the junction of said resistances, first and second sources for positive and negative D.C. reference voltages, means for directly comparing said amplified signal to said positive and negative reference voltages and for producing an alternating current error voltage proportional in magnitude to the difference between said positive and negative reference voltages and the peak positive and negative values respectively of said amplified signal, and means responsive to said alternating current error voltage for varying said variable resistance in a direction to reduce said error voltage to zero.

3. A compressor amplifier as defined by claim 2 wherein said variable resistance is a vacuum tube having a control grid, and further wherein the last-mentioned means of claim 2 includes means for generating a direct current error voltage in response to said alternating current error voltage, and means for applying said D.C. error voltage to said control grid.

4. A compressor amplifier as defined by claim 2 wherein said variable resistance comprises the plate resistance of two vacuum tube amplifiers connected in push-pull relation.

5. A compressor amplifier as defined by claim 2 wherein said variable resistance comprises the plate resistance of two class A amplifiers connected in push-pull relation.

6. A compressor amplifier comprising a first input terminal for an alternating current signal, an A.C. amplifier having a second input terminal, a fixed resistance connecting said first and second input terminals, a variable resistance connected between ground and the junction of said fixed resistance and second terminal, an output terminal, means for applying the alternating current output of said A.C. amplifier to said output terminal, means providing positive and negative D.C. reference voltages, an error sensing comparison circuit for comparing the output of said A.C. amplifier to said positive and negative reference voltages and for producing an A.C. error signal whose positive and negative swings are proportional in amplitude to the difference between said positive and negative reference voltages and the peak positive and negative swings respectively of said A.C. amplifier output, means for integrating said A.C. error signal, and means responsive to said integrated A.C. error signal for varying said variable resistance in a direction to minimize said error signal.

7. A compressor amplifier as defined by claim 6 wherein said variable resistance consists of the plate resistance of two remote cutoff vacuum tubes operated in push-pull.

8. A compressor amplifier comprising an A.C. amplifier, means for applying an input A.C. signal to said A.C. amplifier for amplification, means for establishing positive and negative reference voltages of constant value, means for algebraically subtracting said positive and negative reference voltages from the peak positive and negative values respectively of the output voltage of said A.C. amplifier to produce an A.C. error voltage, and means responsive to the positive and negative excursions of said A.C. error voltage for varying the amplitude of said input signal in a direction to maintain said output voltage substantially constant in amplitude.

9. A compressor amplifier as defined by claim 8 wherein said last-mentioned means includes means for rectifying and integrating said A.C. error voltage to produce a D.C. error voltage, a variable resistance connected in shunt with said A.C. amplifier, and means responsive to said D.C. error voltage for varying said resistance in a direction to minimize said A.C. error voltage.

References Cited in the file of this patent

UNITED STATES PATENTS

| | | |
|---|---|---|
| 2,346,020 | Gillespie | Apr. 4, 1944 |
| 2,580,376 | Moses | Dec. 25, 1951 |
| 2,757,245 | Pihl | July 31, 1956 |
| 2,760,008 | Schade | Aug. 21, 1956 |
| 2,793,289 | Smith | May 21, 1957 |
| 2,902,548 | Moeller | Sept. 1, 1959 |

FOREIGN PATENTS

| | | |
|---|---|---|
| 1,114,854 | France | Dec. 26, 1955 |